US012602463B2

(12) United States Patent
Morelli et al.

(10) Patent No.: US 12,602,463 B2
(45) Date of Patent: Apr. 14, 2026

(54) COMMUNICATION SERVICE ADAPTION

(71) Applicant: Clubster, LLC, Mercer Island, WA (US)

(72) Inventors: McRedmond Morelli, Mercer Island, WA (US); Patrick James Murray, Lancaster, OH (US); Bryan Freitas, Angra do Heroísmo (PT); William J. King, Dallas, TX (US)

(73) Assignee: Clubster, LLC, Mercer Island, WA (US)

( * ) Notice: Subject to any disclaimer, the term of this patent is extended or adjusted under 35 U.S.C. 154(b) by 196 days.

(21) Appl. No.: 18/223,926

(22) Filed: Jul. 19, 2023

(65) Prior Publication Data

US 2025/0028809 A1    Jan. 23, 2025

(51) Int. Cl.
| *G06F 21/33* | (2013.01) |
| *H04L 67/02* | (2022.01) |
| *H04L 67/306* | (2022.01) |
| *H04M 1/72445* | (2021.01) |
| *H04M 1/72454* | (2021.01) |

(52) U.S. Cl.
CPC .............. *G06F 21/33* (2013.01); *H04L 67/02* (2013.01); *H04L 67/306* (2013.01); *H04M 1/72445* (2021.01); *H04M 1/72454* (2021.01); *G06F 2209/541* (2013.01)

(58) Field of Classification Search
None
See application file for complete search history.

(56) References Cited

U.S. PATENT DOCUMENTS

| 7,590,415 | B2 * | 9/2009 | Tijerino | .............. G06F 16/9537 |
| | | | | 455/414.3 |
| 8,078,476 | B2 * | 12/2011 | Alperin | ................. H04L 51/214 |
| | | | | 709/219 |
| 8,505,095 | B2 * | 8/2013 | Mahaffey | .............. H04W 12/10 |
| | | | | 726/25 |
| 9,105,039 | B2 * | 8/2015 | Kramer | .............. G06Q 30/0225 |
| 10,346,398 | B2 * | 7/2019 | Beier | .................... G06F 16/244 |
| 10,367,892 | B2 * | 7/2019 | Koum | ..................... H04L 67/10 |
| 11,367,892 | B2 * | 6/2022 | Laramie | .............. H01M 50/434 |
| 11,463,389 | B1 * | 10/2022 | Gupta | ................... H04L 51/066 |
| 11,494,741 | B1 * | 11/2022 | Schemers | ........... H04L 12/1818 |
| 11,497,296 | B2 * | 11/2022 | McMicken | ............. E04H 15/04 |
| 11,784,949 | B2 * | 10/2023 | Delp | ................... G06Q 10/101 |
| 12,052,318 | B1 * | 7/2024 | Morelli | ................. H04L 67/306 |

(Continued)

*Primary Examiner* — Lashonda Jacobs-Burton
(74) *Attorney, Agent, or Firm* — Conley Rose, P.C.

(57) ABSTRACT

Methods, systems, and apparatus, including computer programs encoded on a computer storage medium, to adapt a communication service are disclosed. In one aspect, a method includes the actions of maintaining, by a computing device, a communication service that is accessible through a first user interface. The actions further include determining, by the computing device, characteristics of a user who has access to the first user interface. The actions further include, based on the characteristics of the user who has access to the first user interface, determining, by the computing device, a second user interface that is configured to access the communication service. The actions further include providing, by the computing device, the user access to the second user interface that is configured to access the communication service.

20 Claims, 3 Drawing Sheets

300

(56) References Cited

U.S. PATENT DOCUMENTS

| | | | | |
|---|---|---|---|---|
| 12,277,458 | B1 * | 4/2025 | Gonzales ................. | G06F 9/541 |
| 12,288,190 | B2 * | 4/2025 | Frank .................... | G06Q 10/103 |
| 2003/0224814 | A1 * | 12/2003 | Qu .......................... | H04W 4/12 |
| | | | | 455/466 |
| 2004/0019476 | A1 * | 1/2004 | Glynn ..................... | G10L 15/26 |
| | | | | 704/E15.045 |
| 2004/0048612 | A1 * | 3/2004 | Virtanen .............. | H04W 76/20 |
| | | | | 455/435.2 |
| 2005/0015443 | A1 * | 1/2005 | Levine ................. | H04L 51/066 |
| | | | | 709/204 |
| 2007/0060177 | A1 * | 3/2007 | Major ................... | H04L 51/066 |
| | | | | 455/466 |
| 2009/0265429 | A1 * | 10/2009 | Gestsson ................ | H04L 51/56 |
| | | | | 709/204 |
| 2010/0169424 | A1 * | 7/2010 | Gustafsson ............ | H04L 51/56 |
| | | | | 709/206 |
| 2010/0304713 | A1 * | 12/2010 | Bright ................... | H04W 12/06 |
| | | | | 455/411 |
| 2012/0195325 | A1 * | 8/2012 | Connelly ............. | H04L 51/214 |
| | | | | 370/432 |
| 2013/0159443 | A1 * | 6/2013 | Dellenbach ........... | H04L 51/043 |
| | | | | 709/206 |
| 2015/0089389 | A1 * | 3/2015 | Cohen-Zur ......... | G06F 3/04886 |
| | | | | 715/752 |
| 2016/0171453 | A1 * | 6/2016 | Zorfas ................ | G06Q 10/1093 |
| | | | | 705/7.19 |
| 2016/0191667 | A1 * | 6/2016 | Desai .................... | H04L 65/613 |
| | | | | 709/217 |
| 2017/0034649 | A1 * | 2/2017 | Dotan-Cohen ... | H04M 1/72454 |
| 2017/0041213 | A1 * | 2/2017 | Nadalin ................. | H04L 45/22 |
| 2018/0063070 | A1 * | 3/2018 | Zucker .................. | H04L 51/56 |
| 2018/0063071 | A1 * | 3/2018 | Watson ................. | H04L 67/306 |
| 2018/0198745 | A1 * | 7/2018 | Talwar .................. | H04L 51/23 |
| 2018/0248996 | A1 * | 8/2018 | Johnson ................. | H04W 4/08 |
| 2020/0107152 | A1 * | 4/2020 | Dotan-Cohen ....... | H04W 24/02 |
| 2020/0341593 | A1 * | 10/2020 | Han .................... | G06F 3/04847 |
| 2021/0132749 | A1 * | 5/2021 | Delanghe ............. | G06F 16/953 |
| 2021/0319402 | A1 * | 10/2021 | Ramaswamy .......... | H04L 51/52 |
| 2021/0329435 | A1 * | 10/2021 | Park ...................... | H04W 4/12 |
| 2022/0360550 | A1 * | 11/2022 | Gupta .................. | H04L 51/066 |
| 2022/0382820 | A1 * | 12/2022 | Zagat .................. | H04L 67/535 |
| 2024/0037674 | A1 * | 2/2024 | Brenna ................ | G06Q 10/40 |
| 2024/0430220 | A1 * | 12/2024 | Gupta .................. | H04L 51/046 |

* cited by examiner

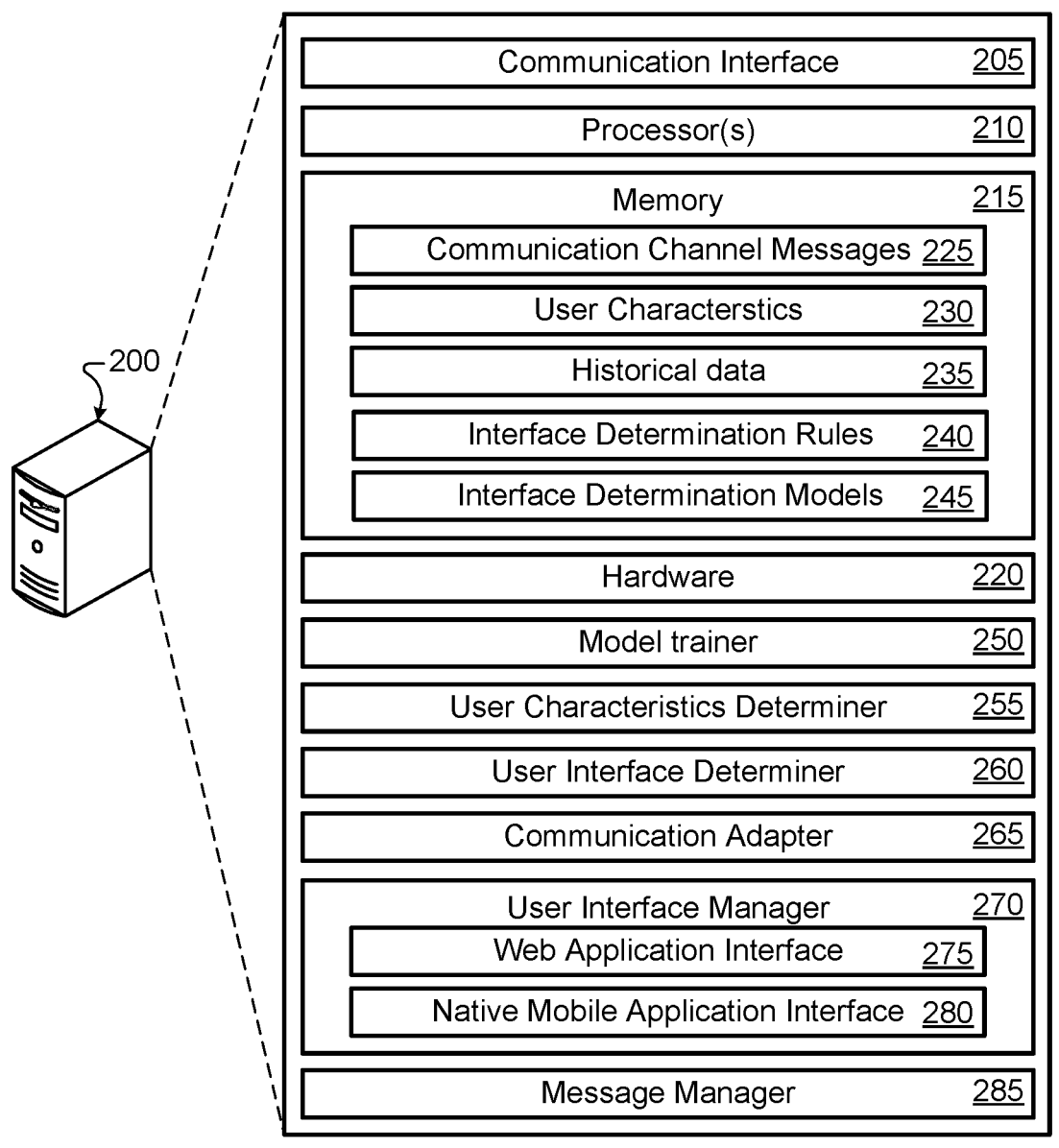

200

| Communication Interface | 205 |
| Processor(s) | 210 |

Memory 215

Communication Channel Messages 225

User Characterstics 230

Historical data 235

Interface Determination Rules 240

Interface Determination Models 245

| Hardware | 220 |
| Model trainer | 250 |
| User Characteristics Determiner | 255 |
| User Interface Determiner | 260 |
| Communication Adapter | 265 |

User Interface Manager 270

Web Application Interface 275

Native Mobile Application Interface 280

| Message Manager | 285 |

Figure 3:
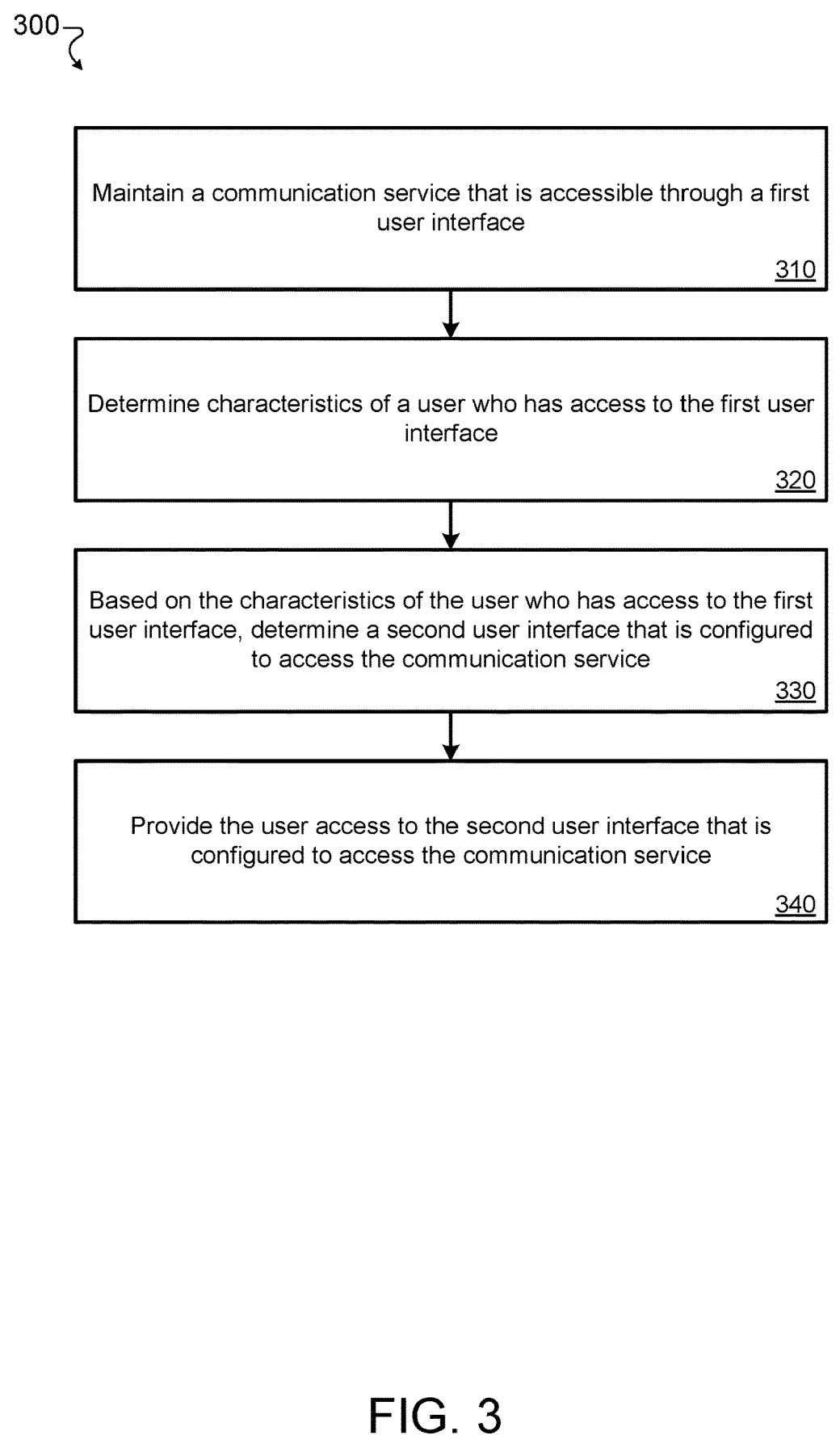

Maintain a communication service that is accessible through a first
user interface

310

Determine characteristics of a user who has access to the first user
interface

320

Based on the characteristics of the user who has access to the first
user interface, determine a second user interface that is configured
to access the communication service

330

Provide the user access to the second user interface that is
configured to access the communication service

COMMUNICATION SERVICE ADAPTION

TECHNICAL FIELD

This specification generally relates to communication services, and, in more detail, to communication services with a plurality of user interfaces.

BACKGROUND

Clubs are an enduring institution that bring people together for a variety of purposes. There are many kinds of clubs, some more formal, some informal, but most clubs have a need to communicate with their members and a desire to facilitate communication among members. Over the years different types and modes of communication have waxed and waned in popularity and more recently there has been a proliferation of types of computer-facilitated communication. Individuals may have preferred types and modes of communication depending on the club or activity, or just in general. Particular activities may lend themselves to particular types or modes of communication.

SUMMARY

High engagement communication channels for clubs, such as club news feeds with member comments, club event calendars, and reservation systems, benefit both club operators and club members, but there are club members who, for whatever reason, are hesitant to participate in these high engagement communication channels. It is desirable to convert these hesitant, low engagement members into high engagement members and also to provide club services to these hesitant, low engagement members in as a complete manner as possible. To this end, low engagement communication channels, such as email and voice, may be adapted to integrate with the high engagement communication channels. Adaptations may include making high engagement communication channel content accessible via low engagement communication channels as well as enabling club staff to interact with the high engagement communication channels on behalf of the hesitant, low engagement member. Interfaces for both the high engagement communication channels and the low engagement communication channels may be configured to facilitate seamless transition between the two.

An innovative aspect of the subject matter described in this specification may be implemented in methods that include the actions of maintaining, by a computing device, a communication service that is accessible through a first user interface; determining, by the computing device, characteristics of a user who has access to the first user interface; based on the characteristics of the user who has access to the first user interface, determining, by the computing device, a second user interface that is configured to access the communication service; and providing, by the computing device, the user access to the second user interface that is configured to access the communication service.

These and other implementations can each optionally include one or more of the following features. The characteristics of the user who has access to the first user interface comprises data indicating that the user accesses the first user interface at a periodic frequency that is less than a threshold periodic frequency. The actions include, based on determining the second user interface, generating, by the computing device, the second user interface. The action of determining the second user interface includes determining multiple user interfaces that the user accesses at a periodic frequency that is greater than a threshold periodic frequency; and selecting, from among the multiple user interfaces, the second user interface.

The first user interface comprises a web application or a smart phone application. The second user interface comprises an email interface or a voice user interface. The second user interface is configured to access the communication service through the first user interface. The actions include providing, by the computing device and to an additional computing device of the user that is configured to access the second user interface, a token that is configured to authenticate the user to the communication service. The actions of providing the user access includes transitioning the user from the first to the second user interface based at least in part on a token. The actions include generating and/or issuing the token via the first user interface.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Clubs can engage with members through additional interfaces than what the systems of the club may be natively configured to handle. This can reduce the need for additional systems that are natively configured to communicate through the additional interfaces.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 2 illustrates an example server that is configured to adapt a communication service to reach members who use various communication interfaces in accordance with at least one embodiment.

FIG. 3 is a flowchart of an example process for adapting a communication service to reach members who use various communication interfaces in accordance with at least one embodiment.

DETAILED DESCRIPTION

Figure 1:
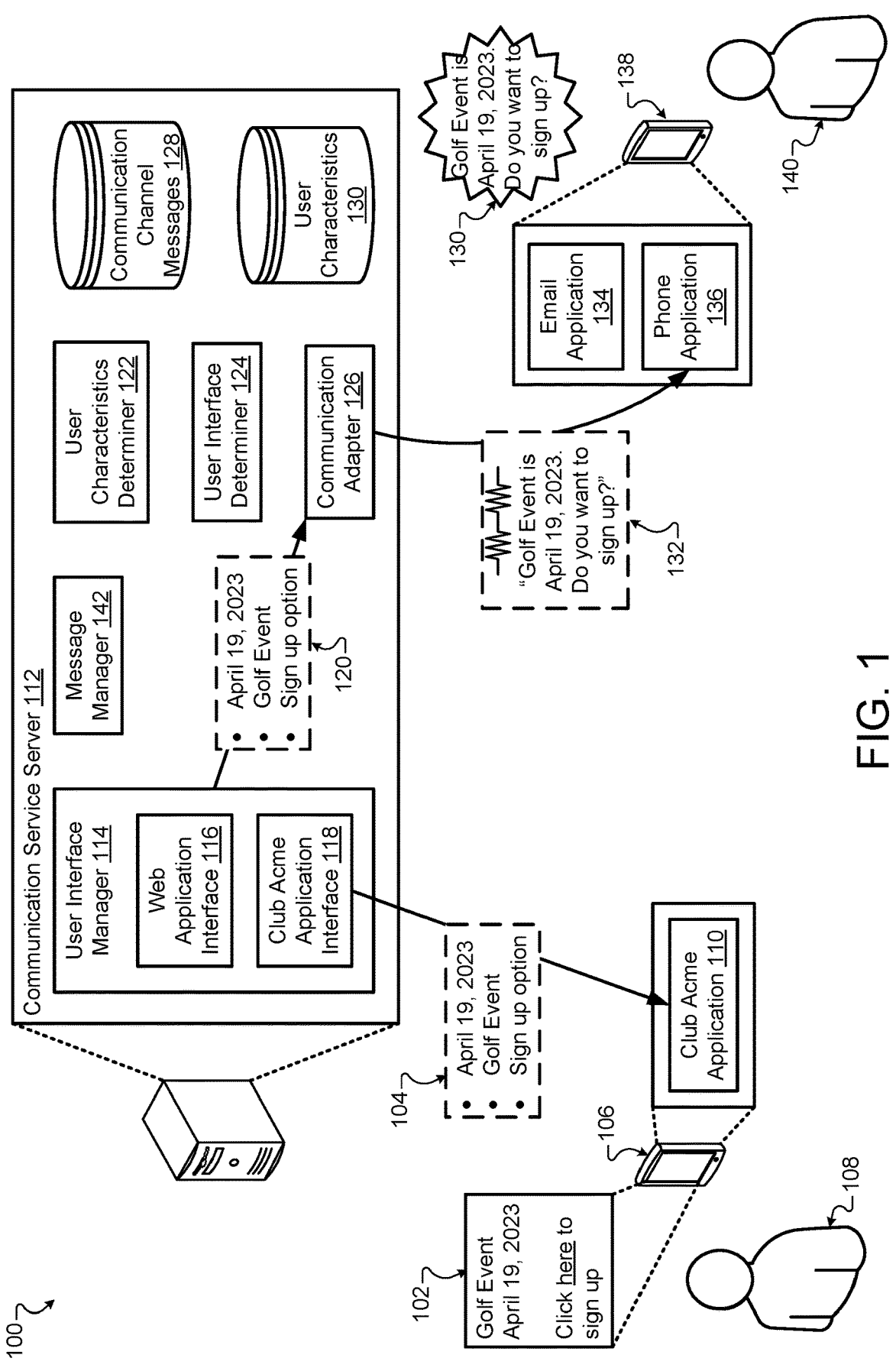
FIG. 1 illustrates an example system that is configured to adapt a communication service to reach members who use various communication interfaces in accordance with at least one embodiment.

FIG. 1 illustrates an example system 100 that is configured to adapt a communication service to reach members who use various communication interfaces. Briefly, and as described in more detail below, the users 108 and 140 may be attempting to interact with a communication service. For example, the communication service may include computer-facilitated communication of various types between the users 108 and 140. The communication service may provide a newsfeed, event calendar, reservation service, etc. for a club. The user 108 may be more comfortable interacting with the communication service using a native mobile application 110 while the user 140 may be more comfortable interacting with the communication service using different modes of communication such as email or voice. To reach those users such as user 140, the communication service may include a communication adapter 126 that allows users to interact with the communication using other modes of communication that may not be inherent in the communication service.

In more detail, the communication service server 112 is configured to manage communication channels for various clubs. The communication service server 112 may include any suitable type of computing device that is configured to communicate with other computing devices. For example, the communication service server 112 may include a desktop computer, a laptop computer, a mobile device, a wearable device, a mainframe computer, a tablet, and/or any other similar type of device. In some implementations, the communication service server 112 may include a virtual device that is located in the cloud. In some implementations, the different components of the communication service server 112 may be located on different computing devices including virtual devices.

Each club may have one or more communication channels to disseminate information to members, receive information from the members, and allow members to interact with each other. The communication channels may be related to various interest groups within a club. The interest groups may include a golf group, a tennis group, swimming group, a dining group, and/or any other similar group. The communication service server 112 may use various interfaces to reach each of the interest groups and allow the users in the group to view the messages on the communication channel, receive information from the users, and interact with each other.

The communication service server 112 may implement a user interface manager 114 by executing software on one or more processors. The user interface manager 114 may include the various interfaces to interact with the users. The interfaces may include a web application interface 116, a native mobile application interface 118, a social media network interface, and/or any other similar type of interface. Each of the interfaces may be configured to provide data of the communication channels to corresponding applications. The data may include various communication channel messages 128 that the club wishes to disseminate to the various users of the club who may have requested messages related to different interest groups.

The communication service server 112 may implement a message manager 142 by executing software on one or more processors. The message manager 142 may be configured to receive messages from various clubs, store those messages in the communication channel messages 128, and coordinate outputting those messages to the various users. The messages may be any suitable type of text, image, video, or audio-based message that the club may wish to disseminate to its members. For example, a message may include the dinner menu for the day, social events that are upcoming or have past, sporting events that are upcoming or have past, media from past events, new member announcements, and/or any other similar type of information. The messages may also include requests for a response or other information from the user. For example, a message about a sporting event may include a request for whether the user wishes to participate. As another example, a message about a dinner menu may include a request for whether the user would like to place a to go order or would like to make a reservation in the dining room.

The communication channel messages 128 may include the content of each message, the time and date that the communication service server 112 received the message, data identifying an interest group associated with the message, data identifying a club associated with the message, data identifying an author or sender of the message, a link to additional information, and/or any other similar information. The communication channel messages 128 may also include any requested information that the club may wish to receive from those users who receive the message.

The message manager 142 and the user interface manager 114 may provide the messages to the computing devices of the users. The communication service server 112 may be configured such that the message manager 142 and the user interface manager 114 can utilize various interfaces to provide messages to the computing devices of the users. A first example interface may be the web application interface 116. The web application interface 116 may be configured to provide messages to a computing device of the user through a web application that is running in a browser on the computing device of the user. The user may provide input into the web application. The message manager 142 may receive the input and store the input in the communication channel messages 128 and/or provide the user's input to another computing device or storage location.

A second example interface that the message manager 142 and the user interface manager 114 utilize to provide messages to computing devices of the users is the native mobile application interface 118. The native mobile application interface 118 may be configured to provide messages to a computing device of the user through a native application 110 that is being executed by the computing device 106. The user 108 may provide input into the native application 110. The message manager 142 may receive the input and store the input in the communication channel messages 128 and/or provide the user's input to another computing device or storage location.

In the example of FIG. 1, the user 108 may be interacting with the computing device 106 that is executing the Club Acme native application 110. The Club Acme native application 110 may allow the user 108 to view various messages related to the club, provide feedback to the club, provide information related to requests from the club, interact with other club members, and/or any other similar information exchange. To provide messages to the Club Acme native application 110, the message manager 142 may access the communication channel messages 128 and select a message for output. The message manager 142 may provide the message to the user interface manager 114. The user interface manager 114 may utilize the Club Acme application interface 118 to transmit the message 104 to the Club Acme application 110. The message 104 may indicate that there is a golf event on Apr. 19, 2023. The message 104 may also include a request for a response related to whether the user would like to attend the golf event.

The Club Acme application 110 may receive the message 104 and output a graphical interface 102 that allows the user 108 to interact with the message. The graphical interface 102 may indicate that the golf event is Apr. 19, 2023. The graphical interface 102 may also include a selectable option that allows the user 108 to respond to the request for whether the user 108 will attend the golf event. The Club Acme application 110 may receive the response and transmit the response to the Club Acme application interface 118. The Club Acme application interface 118 may receive the response and provide the response to the message manager 142. The message manager 142 may store the response in the communication channel messages 128, provide the response to another computing device, and/or store the response in another location.

In some implementations, the Club Acme native application 110 may not be club specific. Instead, the Club Acme native application 110 may be an application that allows the user 108 of the computing device 106 to access communications from multiple clubs. In this case, the Club Acme application interface 118 may be configured to receive messages from multiple clubs and provide those messages to the appropriate native applications. In some implementations, the web application may also allow the user access to messages from multiple clubs.

There may be instances where the message manager 142 is attempting to transmit a message to a user. For various reasons, the user may be unable, unwilling, and/or uninterested in receiving message through the interfaces included in the user interface manager 114. In this case, the communication service server 112 may include a communication adapter 126 that is configured to interact with different communication modes that may be different than those that that the user interface manager 114 is configured to.

In some implementations, before the message manager 142 attempts to transmit a message to a user 140, the message manager 142 may access the user characteristics 130. The user characteristics 130 may have various information related to the various members of the clubs for which the communication service server 112 manages communications. The user characteristics 130 may be located in a storage device that is included in the communication service server 112 and/or accessible by the communication service server 112. The user characteristics 130 may include, among other information, whether a user is unable, unwilling, and/or uninterested in receiving message through the interfaces included in the user interface manager 114. If the message manager 142 is attempting to transmit a message to a user 140 who is unable, unwilling, and/or uninterested in receiving message through the interfaces included in the user interface manager 114, then the message manager 142 identify an appropriate interface for the user 140 and utilize the communication adapter 126 to communicate with the user 140.

In some implementations, the message manager 142 may not initially access the user characteristics 130 before attempting to transmit a message to a user 140. In this case, the message manager 142 may provide the message to the user interface manager 114. The user interface manager 114 may attempt to utilize the available interfaces, such as the web application interface 116 and the native application interface 118, to transmit the message to the user 140. The user interface manager 114 may generate an error because the available interfaces were unable to transmit the message to the user. This may occur because the user 140 does not have the native mobile application installed on the computing device 138, does not have an account with the native mobile application and/or the web application, and/or any other similar reason. In some implementations, the user interface manager 114 may generate an error if the user 140 does not view the message within a threshold period of time, such as three days.

To determine the appropriate interface for providing the message to the user 140, the message manager 142 may request that the user characteristics determiner 122 generate and/or identify characteristics of the user 140. The user characteristics determiner 122 may be implemented by one or more processors executing software stored in a storage device. The user characteristics determiner 122 may store the generated user characteristics in the user characteristics 130 in association with data identifying the corresponding user. The user characteristics 130 may include data indicating the clubs to which the user is a member, the interest groups that the user is associated with, the communication methods that the user has responded to, the communication methods that the user has not responded to, timestamps indicating when the user has utilized a communication method, timestamps indicating when the user has received a message and the corresponding communication method, timestamps indicating when a user has output a message and the corresponding communication method, demographic information, the type of member that the user is of the different clubs that the user is associated with, data identifying computing devices of the user, a date the user joined each club, data indicating to the resources of the clubs that the user utilizes, and/or any other similar characteristics of the user.

The user characteristics determiner 122 may generate and/or identify the various characteristics of the users by accessing various computing devices associated with the clubs, requesting information from various users, and/or by collecting information as users interact with the communication service server 112. In some implementations, the user characteristics determiner 122 may update the user characteristics 130 in response to a request from a computing device and/or a component of the communication service server 112. In some implementations, the user characteristics determiner 122 may update the user characteristics 130 on a periodic basis, such as once per day.

The communication service server 112 may include a user interface determiner 124. The user interface determiner 124 may be implemented by one or more processors executing software stored in a storage device. The user interface determiner 124 may be configured to receive a request from the message manager 142 to identify a communication method to communicate with the user 140. The message manager 142 may make that request in response to receiving an error from the user interface manager 114 and/or determining that the user characteristics 130 for the user 140 indicated that the user 140 is unwilling, unable, and/or uninterested in receiving communications through the available interfaces.

The user interface determiner 124 may analyze the user characteristics 130 for the user 140. Based on that analysis, the user interface determiner 124 may select a communication method for the user 140. In some implementations and in response to selection of the communication method for the user 140, the message manager 142 may update the user characteristics 130 for the user 140 indicating the selected communication method and/or the communication attempt using the selected communication method.

The user interface determiner 124 may analyze the user characteristics 130 for the user 140 using various models and/or rules. Details related to the models and rules will be discussed below with respect to FIG. 2. In short, the models may be configured to receive the user characteristics 130 for the user 140 and output data indicating a communication method to use to communicate with the user 140. The rules may specify various ranges, thresholds, logical statements, and/or other comparison techniques to apply to the user characteristics 130 for the user 140. Based on those comparisons, the rules may specify a communication method to use to communicate with the user 140. In some implementations, the user interface determiner 124 may also analyze the message 120.

The user interface determiner 124 may select a communication method that corresponds to the capabilities of the communication adapter 126. The communication adapter 126 may be configured to communicate using various communication methods and provide data identifying those communication methods to the user interface determiner 124. In some implementations, the models may also be configured to receive data identifying the communication methods of the communication adapter 126. In some implementations, the comparison techniques of the rules may utilize the communication methods of the communication adapter 126. In the example of FIG. 1, the user characteristics determiner 122 may analyze the user characteristics 130 of the user 140. Based on this analysis, the user characteristics determiner 122 may determine to communicate with the user 140 using voice communications.

As noted above, the communication service server 112 may include a communication adapter 126. The communication adapter 126 may be implemented by one or more processors executing software stored in a storage device. The communication adapter 126 may be configured to adapt a message that is configured to be output to one interface into a message that is configured to be output to a different interface. Adapting a message may involve parsing the message to identify the content of the message. With the message parsed, the communication adapter 126 may adapt the components of the message to comply with any requirements of the selected communication method. The communication adapter 126 may also perform similar adaptions in reverse in order to allow responses from the user to be interpreted and processed by the interface that provided the message to the communication adapter 126.

In other words, the interfaces of the user interface manager 114 may provide messages to an application that is running on a computing device, such as computing device 106 or provide messages to the communication adapter 126. The interfaces of the user interface manager 114 may provide the same type of message whether the message is for the application on the computing device 106 or the communication adapter 126. Similarly, the user interface manager 114 may receive the same type of responses whether the response is from the application on the computing device 106 or the communication adapter 126.

The communication adapter 126 may be configured to adapt messages so that those messages can be transmitted using various communication methods such as phone communication, email communication, audio communication, voicemail communication, short message service or other messaging communication, and/or any other similar communication method. In order to adapt messages the communication adapter 126 may include components such as a speech synthesizer, speech recognizer, and/or any other similar component. The communication adapter 126 may also manage and/or generate any necessary authentication tokens that allow the communication adapter 126 to authenticate the communication service server 112 to various applications and to authenticate those various applications to the communication service server 112 when the communication adapter 126.

In the example of FIG. 1, the user interface manager 114 may transmit the message 120 to the communication adapter 126 in response to instructions from the message manager 142. The communication adapter 126 may have received instructions from the user interface determiner 124 to use voice communications to transmit the message 120 to the computing device 138 of the user 140. The communication adapter 126 may receive the message 120 and parse the message 120. The communication adapter 126 may identify three parts of the message 120. The three parts may be the date of Apr. 19, 2023, the type of event being a golf event, and a request for the user 140 to indicate whether the user 140 is attending.

The communication adapter 126 may include a speech synthesizer and may convert the three parts of the message 120 into script for the speech synthesizer. The script may be "Golf Event is Apr. 19, 2023. Do you want to sign up?" The speech synthesizer may generate voice audio 132 and transmit the voice audio 132 to the phone application 136 of the computing device 138. The computing device 138 may output a notification to the user 140 that indicates receipt of the voice audio 132. The user 140 may request the computing device 138 output the voice audio 138. The computing device 138 may output the audio 130 using an audio output device of the computing device 138. The user 140 may response to the audio 130 by speaking an answer. The phone application 136 may transmit the voice response of the user 140 to the communication adapter 126. The communication adapter 126 may perform speech recognition on the voice response and provide a response to the user interface manager 114. The communication adapter 126 may include any additional authentication tokens and/or metadata in the response in order to comply with the requirements of the communication method of the message 120.

In some implementations, the message manager 142, the user interface manager 114, and/or the communication adapter 126 may be configured to utilize tokens, such as session tokens or handover tokens, to enable transition between the different interfaces. For example, the message manager 142 may determine to utilize the email application 134 to communicate with the user 140. Based on this determination, the message manager 142 may generate a session token to provide to the user interface manager 114. The session token may include instructions to transmit the message 120 to the communication adapter 126. The communication adapter 126 may use the session token to label communications with the phone application 136 so that the user interface manager 114 can match the communications with the user 140 with the message 120. In some implementations, the user interface manager 114 may generate the session token in response to the request to transmit the message 120 to the communication adapter 126.

FIG. 2 illustrates an example server 200 that is configured to adapt a communication service to reach members who use various communication interfaces. The server 200 may include any suitable type of computing device that is configured to communicate with other computing devices. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the communication service server 112 of FIG. 1. Some of the components of the device may be implemented in a single computing device or distributed over multiple computing devices. Some of the components may be in the form of virtual machines or software containers that are hosted in a cloud in communication with disaggregated storage devices. In some implementations, the server 200 may be a virtual device hosted in the cloud.

The server 200 may include a communication interface 205, one or more processors 210, memory 215, and hardware 220. The communication interface 205 may include communication components that enable the server 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any suitable method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a message manager 285. The message manager 285 may be similar to the message manager 142 of FIG. 1. The message manager 285 may be configured to receive new messages for the communication channel, respond to requests for a messages of a communication channel, maintain various communication channels, provide messages of a communication channel, receive responses to messages, and/or any other similar communication.

The message manager 285 may store the received messages in the communication channel messages 225. The communication channel messages 225 may be similar to the communication channel messages 128 of FIG. 1. The communication channel messages 225 may include messages received by various clubs, response to the messages, communication between users, and/or any other similar data. In some implementations, the communication channel messages 225 may include data indicating which club and/or interest groups a message may belong to.

The one or more processors 210 may implement a user characteristics determiner 260. The user characteristics determiner 260 may be similar to the user characteristics determiner 122 of FIG. 1. The user characteristics determiner 260 may be configured to determine the various user characteristics of the different members of the clubs. In this case, the members of the clubs may include users who have interacted with the server 200 and also users who have not interacted with the server 200. For example, some users may have previously interacted with the server 200 through a native mobile application. Other users who are members of the clubs may have not integrated with the server 200 through the native mobile application. The user characteristics determiner 260 may receive data identifying the members of the clubs from one or more users or other computing devices.

The user characteristics determiner 260 may determine the characteristics of the users using various techniques. The user characteristics determiner 260 may analyze engagement logs that store data related to when and how each user interacted with the server 200. The user characteristics determiner 260 may request data from computing devices that may store information related to members of the clubs. The user characteristics determiner 260 may request data from users such as club employees or members of the clubs. The user characteristics determiner 260 may interact with computing devices that users have used to interact with the server 200.

The user characteristics determiner 260 may store the characteristics of the users in the user characteristics 230. The user characteristics 230 may be similar to the user characteristics 122 of FIG. 1. The user characteristics 230 may include data indicating the clubs to which the user is a member, the interest groups that the user is associated with, the communication methods that the user has responded to, the communication methods that the user has not responded to, timestamps indicating when the user has utilized a communication method, timestamps indicating when the user has received a message and the corresponding communication method, timestamps indicating when a user has output a message and the corresponding communication method, demographic information, the type of member that the user is of the different clubs that the user is associated with, data identifying computing devices of the user, a date the user joined each club, data indicating to the resources of the clubs that the user utilizes, and/or any other similar characteristics of the user.

The one or more processors 210 may implement a user interface manager 270. The user interface manager 270 may be similar to the user interface manager 114 of FIG. 1. The user interface manager 270 may be configured to manage various interfaces for different communication methods that the server 200 uses to communicate with users. The user interface manager 270 may receive a message from the message manager 285 and an instruction to transmit the message using a particular communication method to a user. The user interface manager 270 may also receive responses from users and communications between users through the interfaces included in the user interface manager 270.

As an example, the user interface manager 270 may include a web application interface 275. The web application interface 275 may be configured to communicate with web applications that may be running in browsers located on the computing devices of users. The web application interface 275 may be similar to the web application interface 116 of FIG. 1. As another example, the user interface manager 270 may include a native mobile application interface 280. The native mobile application interface 280 may be configured to communicate with native applications that may be running on the computing devices of users. The native mobile application interface 280 may be similar to the Club Acme application interface 118 of FIG. 1.

The one or more processors 210 may implement a user interface determiner 260. The user interface determiner 260 may be similar to the user interface determiner 124 of FIG. 1. The user interface determiner 260 may be configured to use the interface determination rules 240 and/or the interface determination models 245 to analyze the user characteristics 230. The user interface determiner 260 may also analyze a message and data identifying a user who is to receive the message. Based on that analysis, the user interface determiner 260 may identify a user interface to communicate the message to the user. The user interface determiner 260 may provide data identifying the interface to the message manager 285 and/or the user interface manager 270.

The interface determination models 245 may be configured to receive the user characteristics 230, the message, data identifying the available interfaces of the user, and/or the data identifying the user. The interface determination models 245 may output data identifying a user interface that is most likely to be received by the user. In some implementations, the interface determination models 245 may output a confidence score that indicates a likelihood that the user will receive the message. In some instances, the user may receive the message if the user views and/or listens to the message, and the user may not receive the message if a computing device of the user receives the message without the user viewing or listening to the message.

The one or more processors 210 may implement a model trainer 250. The model trainer 250 may be configured to train the interface determination models 245 using machine learning and the historical data 235. The model trainer 250 may be configured to generate data samples based on the historical data. Each data sample may represent communications between the server 200 and a computing device of a user. The data sample may indicate whether the communication was successful. A successful communication may be one that was viewed and/or listened to by the recipient. In some implementations, a successful communication may be a communication that the user was aware that the user received the communication even if the user chose not to view and/or listen to the communication. Each data sample may also include a label that indicates the interface that the server 200 used to provide the message to the user.

The historical data 235 may include characteristics of each user. The characteristics of each user may include data indicating the clubs to which the user is a member, the interest groups that the user is associated with, the communication methods that the user has responded to, the communication methods that the user has not responded to, timestamps indicating when the user has utilized a communication method, timestamps indicating when the user has received a message and the corresponding communication method, timestamps indicating when a user has output a message and the corresponding communication method, demographic information, the type of member that the user is of the different clubs that the user is associated with, data identifying computing devices of the user, a date the user joined each club, data indicating to the resources of the clubs that the user utilizes, and/or any other similar characteristics of the user.

The historical data 235 may also include data related to the characteristics of each communication. These characteristics may include data identifying the interfaces that were available for the communication, the interfaces that were not available for the communication, the interfaces that the user provided a request to not receive messages through, the interfaces that the user provided a request to receive messages through, the interfaces that the user provided no request regarding whether to receive messages through, the contents of the message, an interest group associated with the message, whether the server 200 previously attempted to transmit the message and through which interface, the interface used to transmit the message, and/or any other similar characteristic of the message.

The model trainer 250 may generate a data sample for each communication included in the historical data. The model trainer 250 may include, in each data sample, a label identifying the interface used for the communication and data indicating whether the communication was successful. Different data samples may include different types of data. This may be the case because the historical data 235 may not include a complete record for each communication. For an example communication, the historical data 235 may include the type of member that the user is at the club. For another example communication, the historical data 235 may not include the type of member that the user is at the club.

The model trainer 250 may group the labeled data samples into groups where each labeled data sample in the group include the same type of data. The model trainer 250 may train, using machine learning, a model that is configured to receive data that corresponds to the types of data in the data sample other than the label. The model may be configured to output data identifying an interface to use to provide the communication to the user. In some implementations, the model may output a confidence score indicating a likelihood that the message will be successfully received by the user. The model may also output what the type of success is such as the message being viewed by the recipient or the user being aware of the message but not viewing it. With different types of models that are configured to receive different types of input, the user interface determiner 260 may select, from the interface determination models 245, a model that is configured to receive the types of data that the user interface determiner 260 has access to when selecting the interface.

The model trainer 250 may be configured to generate the interface determination rules 240 using the historical data 235. The model trainer 250 may analyze the historical data 235 for various patterns that may result in a higher likelihood of a communication being successful. The model trainer 250 may identify various ranges, thresholds, logical statements, and/or other comparison techniques to apply to the user and message characteristics to determine an interface to provide the message to the user. For example, a rule may indicate that if the user utilizes an interface less than a first periodic frequency threshold, then the rule may specify not to select that interface. Another rule may indicate that if the user utilizes an interface greater than a second periodic frequency threshold, then the rule may specify to select that interface. If the user uses more than one interface at a periodic frequency that is above the threshold, then the rule may specify to select the interface with the greater frequency.

In some implementations, the interface determination rules 240 may be based on user input. In this case, the server 200 may receive a request for a rule from a user and may store that rule in the interface determination rules 240. In some implementations, the user-specified rules may be club specific and/or may be user specific. For example, a user-specified rule may indicate to not communicate with a particular user through a native application.

In some implementations, the model trainer 250 may be configured to update, or retrain, the interface determination models 245 after a message has been transmitted to a user.

The message manager 285 may receive data confirming that the user viewed the message, was aware of the message but did not view the message, or was unaware of the message. The message manager 285 may receive this confirmation from a user. The message manager 285 may update the historical data 235 using the data related to the user, the message, and the confirmation. With the new historical data 235, the model trainer 250 may generate an additional data sample and retrain, using machine learning, the interface determination models 245 using the previous data samples and the additional data sample.

The one or more processors 210 may implement a communication adapter 265. The communication adapter 265 may be similar to the communication adapter 126 of FIG. 1. The communication adapter 265 may be configured to interface between an interface of the user interface manager 270 and an application on the computing device of the user. The application on the computing device may be the application that corresponds to the interface selected by the user interface determiner 260. The communication adapter 265 may convert the message and instructions from the interface of the user interface manager 270 into a format that is compatible with the application on the computing device. The communication adapter 265 may also operate in reverse in the case of the user responding to the message. The communication adapter 265 may convert the response from the format received by the application on the computing device to a format compatible with the interface of the user interface manager 270. In other words, the user interface manager 270 is unaware that the user is viewing and responding to the message using a different application than the interface of the user interface manager 270.

In some implementations, interactions between the interface of the user interface manager 270 and the application on the computing device of the user may require some type of authentication. The communication adapter 265 may be configured to manage the authentication aspect to ensure that authentication remains even if the user utilizes a different interface. The communication adapter 265 may manage and provide any suitable tokens or other authentication data to the interface of the user interface manager 270 to simulate an application running on a computing device of the user. The communication adapter 265 may also manage and/or respond to any tokens or other authentication data received from the actual application running on the computing device of the user. By managing the authentication of the various applications, the interface of the user interface manager 270 and the application on the computing device of the user are unaware that each is communicating with the communication adapter 265 instead of the counterpart application or interface.

FIG. 3 is a flowchart of an example process 300 for adapting a communication service to reach members who use various communication interfaces. In general, the process 300 utilizes a communication service to provide club members access to various content related to the club. The communication service may use various interfaces to provide access to that content. Some users may be uninterested, unwilling, and/or unable to access the content through the provided interfaces. In this case, the process 300 may utilize a different interface to provide those users access to the content. The process 300 will be described as being performed by the server 112 of FIG. 1 and will include references to other components in FIG. 1. The process 300 may also be performed by the server 200 of FIG. 2. In some implementations, the process 300 may be performed by one or more computing devices, including virtual computing devices.

The server 112 maintains a communication service that is accessible through a first user interface (310). In some implementations, a club may utilize the communication service to interact with members of the club. Multiple clubs may use the communication service and some members may belong to more than one club. In some implementations, the first user interface may be a web application or a native application. The native application may run on a mobile device such as a phone or tablet or on another type of computing device. The server 112 may provide messages to the users through the first user interface as the users request the messages or as the messages become available. In some implementations, the users may be able to communicate with the clubs and/or with each other through the first user interface.

The server 112 determines characteristics of a user who has access to the first user interface (320). Some users may be unwilling, unable, and/or uninterested in accessing the messages of the communication service through the first user interface. In some instances, these users may make their preferences known to the server 112 by way of requesting communication through alternate means. In some instances, the server 112 may be configured to identify these individuals automatically. By automatically identifying these users, the server 112 may increase engagement more than relying on the users to manually indicate if they request communications through an alternate means.

In some implementations, the characteristics of the user may include data indicating the clubs to which the user is a member, the interest groups that the user is associated with, the communication methods that the user has responded to, the communication methods that the user has not responded to, timestamps indicating when the user has utilized a communication method, timestamps indicating when the user has received a message and the corresponding communication method, timestamps indicating when a user has output a message and the corresponding communication method, demographic information, the type of member that the user is of the different clubs that the user is associated with, data identifying computing devices of the user, a date the user joined each club, data indicating to the resources of the clubs that the user utilizes, and/or any other similar characteristics of the user.

In some implementations, the characteristics of the user may include data indicating that the user accesses the first user interface at a periodic frequency that is less than a threshold periodic frequency. The server 112 may determine the threshold periodic frequency based on various factors. In some implementations, the server 112 may determine the threshold periodic frequency based on a percent of the members of a club who interact with the communication service using the first user interface. A higher percentage of members may result in a larger threshold periodic frequency. In some implementations, the server 112 may determine the threshold periodic frequency based on characteristics of the user. For example, an older user may have a lower threshold periodic frequency than a younger user.

Based on the characteristics of the user who has access to the first user interface, the server 112 determines a second user interface that is configured to access the communication service (330). In some implementations, the server 112 may analyze the characteristics of the user using various models and/or rules. The models and/or rules may be configured to output data indicating the second user interface. In some implementations, the models and/or rules may also receive data indicating the interfaces that are available to the user. These interfaces may include those interfaces that are accessible through (e.g., with and/or using) a computing device of the user. In this case, the server 112 may select an interface from among the interfaces available to the user. In some implementations, the second user interface is an email interface, a phone or voice interface, a voicemail interface, a short messaging service or other type of messaging interface, and/or any other similar type of interface.

In some implementations, the server 112 may include a communication adapter 126 that is configured to generate the second user interface. The communication adapter 126 may generate the second user interface by generating the data to interface with the corresponding application on the computing device of the user. For example, the communication adapter 126 may include a speech synthesizer that generates speech audio of the message to provide to the phone application on the computing device of the user. The phone application may output the speech audio of the message. As another example, the communication adapter 126 may generate an email of the message to provide to the email service that the user accesses through the email application on the computing device.

In some implementations, the communication adapter 126 may be configured such that the communication adapter 126 receives data from a user interface manager 114 that is configured to output data to various interfaces and adapts that data to communicate with the selected interface. The operation of the communication adapter 126 may be transparent to the user interface manager 114. In other words, the user interface manager 114 may not be aware that the user is communicating using a different interface than one of those interfaces available to the user interface manager 114. In this way, the second user interface may access the communication service through the first user interface. This is because the communication adapter 126 is acting as an intermediary between the two interfaces.

The server 112 provides the user access to the second user interface that is configured to access the communication service (340). In some implementations, the communication adapter 126 provides the message in a format that is compatible with the application associated with the second user interface. In some implementations, the server 112 may be configured to generate and/or provide a token that is configured to authenticate the user to the communication service. If a user is interacting with the first interface using an application that is running on a computing device, then the application may provide a token to authenticate the user to the server 112. If the server 112 is using the communication adapter 126 to communicate with the user using the second interface, then the communication adapter 126 may provide the token to the user interface manager 114 to ensure seamless communication when utilizing the second interface.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
maintaining, by a computing device, a communication service (i) that is accessible through a first user interface and a second user interface and (ii) that provides access to a message that is configured to be outputted through the first user interface, wherein the first user interface comprises a web application or a smart phone application, and wherein the second user interface comprises an email interface or a voice user interface;
determining, by the computing device, that a first user, who has access to the first user interface, accesses the communication service through the first user interface at a first periodic frequency;
determining, by the computing device, that a second user, who has access to the first user interface, accesses the communication service through the first user interface at a second periodic frequency;
comparing, by the computing device, the first periodic frequency to a threshold periodic frequency;
comparing, by the computing device, the second periodic frequency to the threshold periodic frequency;
based at least in part on comparing the first periodic frequency to the threshold periodic frequency, selecting, by the computing device and from among the first user interface, the second user interface, and additional user interfaces, the second user interface for the first user;
based at least in part on comparing the second periodic frequency to the threshold periodic frequency, selecting, by the computing device and from among the first user interface, the second user interface, and the additional user interfaces, the first user interface for the second user;
based on selecting the second user interface for the first user, modifying, by the computing device, the message that is configured to be outputted through the first user interface to a format that is compatible with the second user interface;
providing, by the computing device, the first user access to the communication service through the second user interface for the first user to access the modified message;
based on providing the first user access to the communication service through the second user interface, managing, by the computing device, first token data that is configured to identify the modified message and a first response to the modified message from the first user, wherein the first user provides the first response through the second user interface;
providing, by the computing device, the second user access to the communication service through the first user interface for the second user to access the message; and
based on providing the second user access to the communication service through the first user interface, managing, by the computing device, second token data that is configured to identify the message and a second response to the message from the second user, wherein the second user provides the second response through the first user interface.

2. The method of claim 1, comprising:
based on selecting the second user interface, generating, by the computing device, the second user interface.

3. The method of claim 1, wherein the second user interface is configured to access the communication service through the first user interface.

4. A system, comprising:

one or more processors; and memory including a plurality of computer-executable components that are executable by the one or more processors to perform a plurality of acts, the plurality of acts comprising:

maintaining a communication service (i) that is accessible through a first user interface and a second user interface and (ii) that provides access to a message that is configured to be outputted through the first user interface, wherein the first user interface comprises a web application or a smart phone application, and wherein the second user interface comprises an email interface or a voice user interface;

determining that a first user, who has access to the first user interface, accesses the communication service through the first user interface at a first period frequency;

determining that a second user, who has access to the first user interface, accesses the communication service through the first user interface at a second periodic frequency;

comparing the first periodic frequency to a threshold periodic frequency;

comparing the second periodic frequency to the threshold periodic frequency;

based at least in part on comparing the first periodic frequency to the threshold periodic frequency, selecting, from among the first user interface, the second user interface, and additional user interfaces, the second user interface for the first user;

based at least in part on comparing the second periodic frequency to the threshold periodic frequency, selecting, from among the first user interface, the second user interface, and the additional user interfaces, the first user interface for the second user;

based on selecting the second user interface for the first user, modifying the message that is configured to be outputted through the first user interface to a format that is compatible with the second user interface;

providing the first user access to the communication service through the second user interface for the first user to access the modified message;

based on providing the first user access to the communication service through the second user interface, managing first token data that is configured to identify the modified message and a first response to the modified message from the first user, wherein the first user provides the first response through the second user interface;

providing the second user access to the communication service through the first user interface for the second user to access the message; and based on providing the second user access to the communication service through the first user interface, managing second token data that is configured to identify the message and a second response to the message from the second user, wherein the second user provides the second response through the first user interface.

5. The system of claim 4, wherein the plurality of acts comprise:

based on selecting the second user interface, generating the second user interface.

6. The system of claim 4, wherein the second user interface is configured to access the communication service through the first user interface.

7. One or more non-transitory computer-readable media storing computer-executable instructions that upon execution cause one or more computers to perform acts comprising:

maintaining a communication service (i) that is accessible through a first user interface and a second user interface and (ii) that provides access to a message that is configured to be outputted through the first user interface, wherein the first user interface comprises a web application or a smart phone application, and wherein the second user interface comprises an email interface or a voice user interface;

determining that a first user, who has access to the first user interface, accesses the communication service through the first user interface at a first period frequency;

determining that a second user, who has access to the first user interface, accesses the communication service through the first user interface at a second periodic frequency;

comparing the first periodic frequency to a threshold periodic frequency;

comparing the second periodic frequency to the threshold periodic frequency;

based at least in part on comparing the first periodic frequency to the threshold periodic frequency, selecting, from among the first user interface, the second user interface, and additional user interfaces, the second user interface for the first user;

based at least in part on comparing the second periodic frequency to the threshold periodic frequency, selecting, from among the first user interface, the second user interface, and the additional user interfaces, the first user interface for the second user;

based on selecting the second user interface for the first user, modifying the message that is configured to be outputted through the first user interface to a format that is compatible with the second user interface;

providing the first user access to the communication service through the second user interface for the first user to access the modified message;

based on providing the first user access to the communication service through the second user interface, managing first token data that is configured to identify the modified message and a first response to the modified message from the first user, wherein the first user provides the first response through the second user interface;

providing the second user access to the communication service through the first user interface for the second user to access the message; and based on providing the second user access to the communication service through the first user interface, managing second token data that is configured to identify the message and a second response to the message from the second user, wherein the second user provides the second response through the first user interface.

8. The media of claim 7, wherein the acts comprise:

based on selecting the second user interface, generating the second user interface.

9. The method of claim 1, comprising:

determining, by the computing device, a first characteristic of the first user; and determining, by the computing device, the threshold periodic frequency based on the first characteristic.

10. The method of claim 9, wherein the first characteristic is a demographic characteristic.

11. The method of claim 1, wherein managing first token data that is configured to identify the modified message and the first response to the modified message from the first user comprises:

managing a first token configured to identify the modified message; and managing a second token configured to identify the first response.

12. The method of claim 11, wherein the second token is configured to authenticate the first response to the communication service.

13. The system of claim 4, wherein the plurality of acts comprise:

determining a first characteristic of the first user; and determining the threshold periodic frequency based on the first characteristic.

14. The system of claim 13, wherein the first characteristic is a demographic characteristic.

15. The system of claim 4, wherein managing first token data that is configured to identify the modified message and the first response to the modified message from the first user comprises:

managing a first token configured to identify the modified message; and managing a second token configured to identify the first response.

16. The system of claim 15, wherein the second token is configured to authenticate the first response to the communication service.

17. The media of claim 7, wherein the plurality of acts comprise:

determining a first characteristic of the first user; and determining the threshold periodic frequency based on the first characteristic.

18. The media of claim 17, wherein the first characteristic is a demographic characteristic.

19. The media of claim 7, wherein managing first token data that is configured to identify the modified message and the first response to the modified message from the first user comprises:

managing a first token configured to identify the modified message; and managing a second token configured to identify the first response.

20. The media of claim 19, wherein the second token is configured to authenticate the first response to the communication service.

* * * * *